United States Patent [19]

Gray et al.

[11] Patent Number: 4,931,717
[45] Date of Patent: Jun. 5, 1990

[54] LOAD RESPONSE CONTROL AND METHOD

[75] Inventors: Randall C. Gray; Robert Jarrett, both of Tempe, Ariz.

[73] Assignee: Motorola Inc., Schaumburg, Ill.

[21] Appl. No.: 402,282

[22] Filed: Sep. 5, 1989

[51] Int. Cl.[5] .............................................. H02J 7/14
[52] U.S. Cl. ........................................ 323/299; 322/8; 322/18; 322/21; 322/DIG. 2; 320/31; 320/64
[58] Field of Search ..................... 323/299; 320/35, 36, 320/39, 40, 64, 31; 322/8, 17, 18, 19, 21, 22, 23, 24, 25, 38, 39, DIG. 2

[56] References Cited

U.S. PATENT DOCUMENTS

| | | | |
|---|---|---|---|
| 3,622,858 | 11/1971 | Mitchell | 322/18 X |
| 4,384,245 | 5/1983 | Metter | 322/29 X |
| 4,459,489 | 7/1984 | Kirk et al. | 322/8 X |
| 4,470,003 | 9/1984 | Mitchell | 322/23 |
| 4,629,967 | 12/1986 | Voss | 322/17 X |
| 4,629,968 | 12/1986 | Butts et al. | 322/28 X |
| 4,636,706 | 1/1987 | Bowman et al. | 322/29 X |
| 4,651,081 | 3/1987 | Nishimura et al. | 322/38 X |
| 4,697,135 | 9/1987 | Brandon | 322/24 |
| 4,739,243 | 4/1988 | Iwatani et al. | 322/29 X |
| 4,739,244 | 4/1988 | Komurasaki et al. | 322/29 |

Primary Examiner—Patrick R. Salce
Assistant Examiner—Emanuel Todd Voeltz
Attorney, Agent, or Firm—Michael D. Bingham

[57] ABSTRACT

A regulator is responsive to an input signal proportional to the system supply voltage for adjusting the current flowing in the field windings of an electrical alternator which controls the output power thereof. The primary regulation loop of the regulator generates a pulse train having a duty cycle inversely proportional to the amplitude of the input signal while an oscillator provides a sawtooth signal at a predetermined frequency which controls the response frequency of the regulator. The regulator limits the rate of increase in the duty cycle of pulse train upon detecting a decrease in the system supply voltage by converting the duty cycle of the pulse train to a charging signal for developing a voltage across a capacitor proportional to the duty cycle of the pulse train. The voltage across the capacitor is compared to the sawtooth signal and triggers a latch which disables the output signal of the regulator as the duty cycle lengthens in response to the decrease in the system supply voltage. The voltage across the capacitor is increased each oscillator cycle until the duty cycle reaches the value required to support the output power of the alternator.

17 Claims, 3 Drawing Sheets

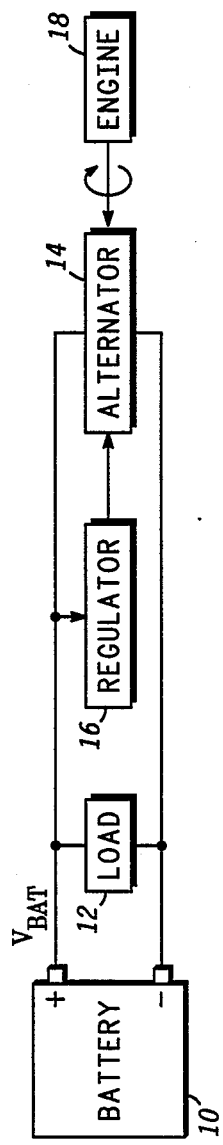
FIG. 1 −PRIOR ART−
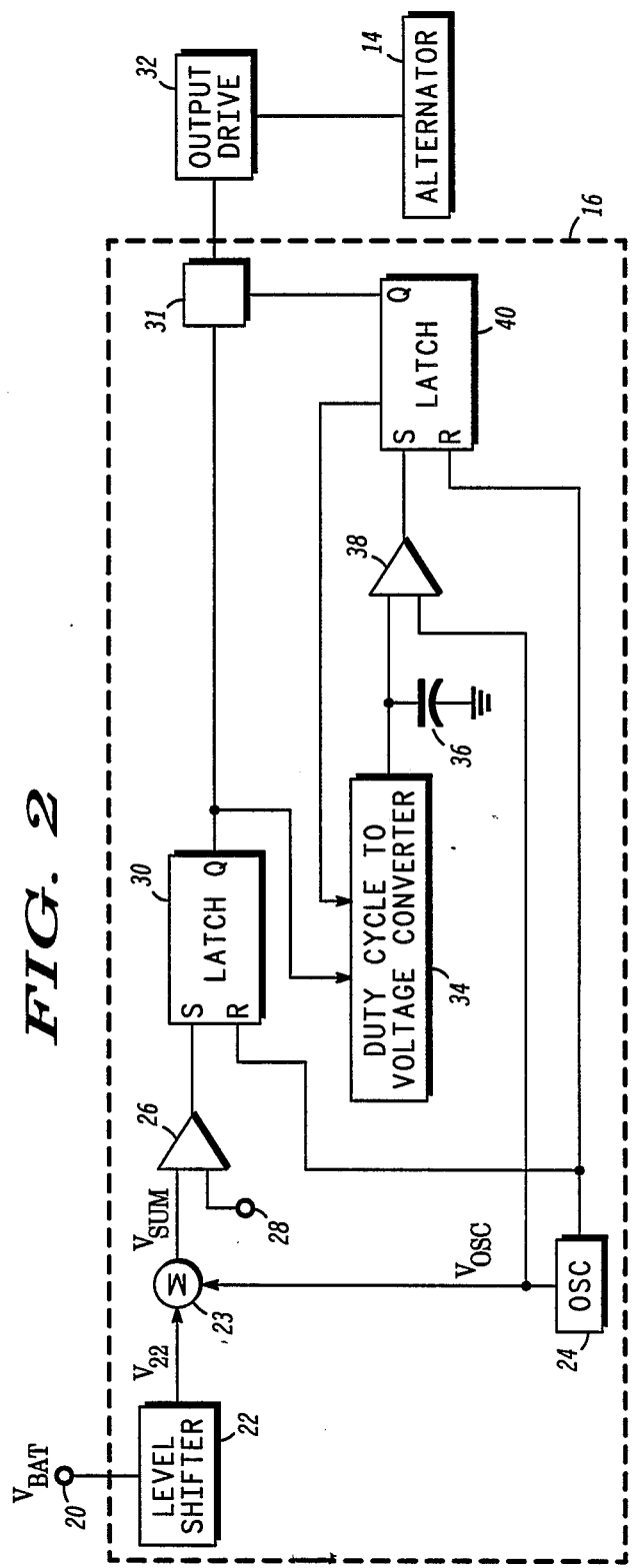
FIG. 2

LOAD RESPONSE CONTROL AND METHOD

BACKGROUND OF THE INVENTION

The present invention relates to load response control, and more particularly, to a method of implementing load response control wherein a time delay is inserted in the regulation loop of an electrical alternator for isolating the latter from transient electrical loads.

Most, if not all, of today's motor vehicles include a mechanically-driven DC generator electrically coupled to a battery. An alternator is one example of the DC generator which supplies the power to the electrical system and recharges the battery as required. The alternator includes rotating magnetic field windings magnetically coupled to stationary stator windings for providing output power as a function of the speed of the rotation and the current flowing in the field windings. The rotating field windings are coupled to the output of a voltage regulator via metallic brushes. The regulator monitors the variation in the system supply voltage and controls the current flowing in the field windings in response thereto, wherein the output power of the alternator is adjusted by increasing the field current as the supply voltage drops and decreasing the field current with increasing supply voltage.

Variation in the output power requirements of the alternator are transferred to the engine as a mechanical load. A sufficiently large electrical load forces the regulator to assert maximum field current in response to the corresponding drop in supply voltage. The alternator in turn transfers a large torque load to the engine causing a noticeable reduction in RPM (revolutions per minute) which may be annoying to the operator of the motor vehicle. If the engine is operating at idle speed, the reduction in RPM may even cause the engine to stall.

One technique to solve this problem is disclosed in U.S. Pat. No. 4,459,489 which monitors the system supply voltage and trips a comparator when the supply voltage drops below a predetermined threshold. The transition of the output signal of the comparator triggers a one-shot monostable multivibrator. A voltage is maintained across a first capacitor representative of the last known value of current flowing in the field windings of the generator. The pulse from the multivibrator causes the voltage across the first capacitor to be transferred to a second capacitor, which in turn biases an oscillator for providing a signal having a duty cycle proportional to the bias voltage. The duty cycle increases as the voltage across the second capacitor decays, thus, the output signal of the oscillator, which controls the field current in the generator, is pulse width modulated to slowly increase the field current as a function of the discharge rate of the second capacitor.

One problem with the '489 patent is that the regulation of the field current is not controlled in real time with dynamic variation in the system loading. Once the low voltage has been detected and the one shot triggers the transfer of the capacitor voltage, the regulator continues to ramp up the field current until the time constant of the second capacitor is completed regardless of subsequent changes in the load. Thus, the field current continues to increase even though the load may have in fact been removed during the time constant of the second capacitor.

Thus, what is needed is a method of implementing load response control which provides real time regulation of the alternator in response to dynamic loading conditions while at the same time isolating the alternator from the adverse effects associated therewith.

SUMMARY OF THE INVENTION

Accordingly, it is an object of the present invention to provide an improved method of load response control.

A further objective of the present invention is to provide improved load response control wherein the field current in the alternator is slowly increased in response to a increase in the electrical load.

Another objective of the present invention is to provide an improved method of load response control wherein the field current in the alternator decreases immediately in response to a decrease in the electrical load.

Yet another objective of the present invention is to provide an improved method of load response control including a means of storing a value corresponding to the current flowing in the field windings of the alternator.

Still another objective of the present invention is to provide an improved method of load response control wherein variation in the electrical load does not produce undesirable changes in the engine RPM.

In accordance with the above and other objectives there is provided a regulator responsive to an input signal proportional to the system supply voltage for adjusting the current flowing in the field windings of an electrical alternator which controls the output power thereof and includes an output driver coupled to the field windings of the alternator for controlling the current flowing therein; an oscillator for providing first and second output signals; a primary regulation loop having an input responsive to the input signal and an output coupled to the output driver for providing a pulse train thereat which has duty cycle inversely proportional to the amplitude of the input signal; a capacitor for developing a voltage thereacross; a circuit coupled to the output of the primary regulation loop for converting the duty cycle of the pulse train to a charging signal for developing a voltage across the capacitor proportional to the duty cycle of the pulse train; a comparator for asserting an output signal when the first output signal of the oscillator exceeds the voltage across the capacitor; and latch circuit first having a first input responsive to the output signal of the comparator for providing a low output signal, and a second input responsive to the second output signal of the oscillator for providing a high output signal and an output coupled to the output driver for disabling the pulse train in response to the output signal of the comparator.

BRIEF DESCRIPTION OF THE DRAWINGS

FIG. 1 is a simplified block diagram of a conventional electrical charging system;

FIG. 2 is a simplified block diagram of the preferred embodiment of the present invention;

DETAILED DESCRIPTION OF THE INVENTION

Figure 3A:
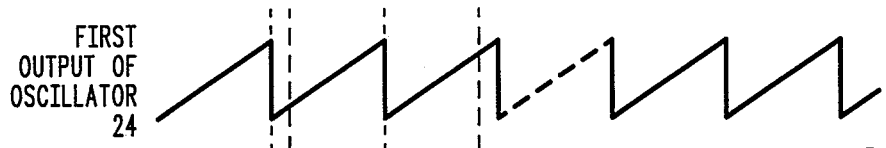
FIGS. 3a–3g are drawings of waveforms which are useful in the description of the present invention.

The simplified drawing of the electrical charging system, as shown in FIG. 1, is representative of most which are used in motor vehicles. Battery 10 includes positive and negative terminals to which are coupled load 12 and alternator 14, the latter being responsive to the output signal of regulator 16 by converting the mechanical energy received from engine 18 into electrical energy and supplying power to load 12 as well as recharging battery 10.

The present invention, illustrated in the simplified block diagram of FIG. 2, is an improvement of regulator 16 and includes a time delay in the regulation loop for limiting the response of alternator 14 to steady state variation in load 12 thereby isolating alternator 14 from load transients.

Figure 3B:

Regulator 16 includes input 20 to which is coupled the positive terminal of battery 10 (not shown) for providing the battery supply voltage, $V_{BAT}$, at the input of level shifter 22 whereby the latter develops a reduced voltage, $V_{22}$, at the first input of summing junction 23 proportional to voltage $V_{BAT}$ and compatible with conventional electronic levels. The second input of summing junction 23 is coupled to the first output of oscillator 24 which generates a voltage, $V_{OSC}$, having a sawtooth waveform as shown in FIG. 3a. The period of voltage $V_{OSC}$ should be much less than the time constant of the inductive field windings of alternator 14 which is typically 200–300 milliseconds, thus, the frequency of oscillator 24 is typically set to operate at 200 hertz (5 milliseconds), whereby the control signal from regulator 16 appears real time relative to the response time of alternator 14. The amplitude of voltage $V_{OSC}$ typically oscillates between 0.7 and 3 volts to provide sufficient dynamic range. The second output of oscillator 24 provides a pulse train having high output signal during the negative transition of voltage $V_{OSC}$ and a low output signal otherwise, as shown in FIG. 3b.

Figure 3C:

The summation of voltages $V_{OSC}$ and $V_{22}$ is provided at the output of summing junction 23, hereinafter known as $V_{SUM}$, and is applied to the first input of comparator 26. The waveform of voltage $V_{SUM}$ is shown in FIG. 3c. The peak amplitude of voltage $V_{OSC}$ is time invariant, thus, fluctuation in amplitude of voltage $V_{SUM}$ may be directly attributed to variation in voltage $V_{BAT}$ due to the dynamics of load 12. A voltage, $V_{28}$, equal to the nominal amplitude of $V_{22}$, is applied at the input 28 that is comparator 26 wherein the nominal amplitude of $V_{22}$ corresponds to a nominal operation level of voltage $V_{BAT}$ (typically 14.5 volts). Assuming a nominal operating level of voltage $V_{BAT}$, at the beginning of each oscillator cycle such as shown at time $t_0$ in FIG. 3, the second output of oscillator 24 provides a reset pulse to initiate the oscillator cycle. From that point, the amplitude of voltage $V_{OSC}$ increases until eventually, at time $t_1$, voltage $V_{SUM}$ exceeds voltage $V_{28}$ whereby the output signal of comparator 26 transitions to a high state. Now assume that at time $t_2$ a large step increase is added to load 12, such as may occur when an electric radiator fan is turned on. Voltages $V_{BAT}$ and $V_{22}$ decrease in response to increase in load 12, thereby reducing the amplitude of voltage $V_{SUM}$ and lengthening the time into the oscillator cycle at which comparator 28 trips, now occurring at time $t_4$.

Figure 3D:
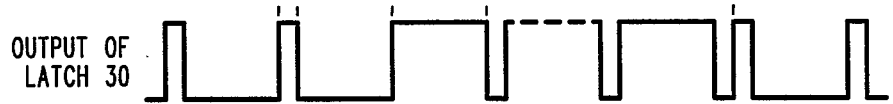

The output of comparator 26 is coupled to the SET input of bi-stable latch 30 while the RESET input is responsive to the pulse provided at the second output of oscillator 24. The output of latch 30 is coupled through buffer 31 to the input of driver 32, the latter of which then controls the current flowing in the field windings, $I_f$. As illustrated in FIG. 3d, the output signal of latch 30 goes high as the signal applied to the RESET input is pulsed high, and the output signal goes low as the signal applied to the SET input transitions high. A low signal at the output of latch 30 disables buffer 31 and turns off driver 32 removing the driving force of field current $I_f$. Notably, field current $I_f$ does not stop flowing due to the inductive properties of the field windings, but rather exponentially decays. Conversely, a high signal at the output of latch 30, reinstated at each reset pulse, passes through buffer 31 and turns on driver 32 to reestablish the electromotive force driving field current $I_f$. Hence, the average value of field current is proportional to the duty cycle of the input signal of driver 32. In other words, the input signal of driver 32 is pulse width modulated in a constant frequency variable duty cycle mode in response to amplitude variation of voltage $V_{BAT}$.

The aforedescribed operation of the primary regulation loop of regulator 16 is well known in the art and is known to be used by at least one U.S. automotive manufacturer. However, this configuration does not solve the problem discussed herein, that is, a step load may sharply decrease voltage $V_{BAT}$ delaying the trip point of comparator 26 within the oscillator cycle thereby extending the duty cycle of the input signal of driver 32 and turning on maximum field current $I_f$ in response thereto typically within a few oscillator cycles causing alternator 14 to apply maximum load to engine 18, the latter of which may not possess sufficient inertia to support the applied mechanical load. Accordingly, a secondary regulation loop is disclosed herein, namely duty cycle-voltage converter 34, capacitor 36, comparator 38 and latch 40 which provides a time delay to limit the rate of increase in the duty cycle.

Duty cycle-voltage converter 34 is responsive to the output signal of latch 30 for providing a signal to capacitor 36 the latter of which stores a voltage as a function of the duty cycle of the output signal of latch 30. Capacitor 36 is coupled between the output of duty cycle-voltage converter 34 and a power supply terminal typically operating at ground potential. The voltage across capacitor 36, $V_{36}$, is applied to the first input of comparator 38 while the second input is responsive to voltage $V_{OSC}$. The output signal of comparator 38 goes high when voltage $V_{OSC}$ exceeds voltage $V_{36}$. The output of comparator 38 is coupled to the SET input latch 40 while the RESET input is responsive to the pulsed reset signal provided at the second output of oscillator 24. Latch 40 operates in the same manner as described for latch 30. Since the outputs of latches 30 and 40 are coupled to the input of driver 32 through buffer 31, either latch may disable the input signal of driver 32.

Figure 3E:
Figure 3F:
Figure 3G:
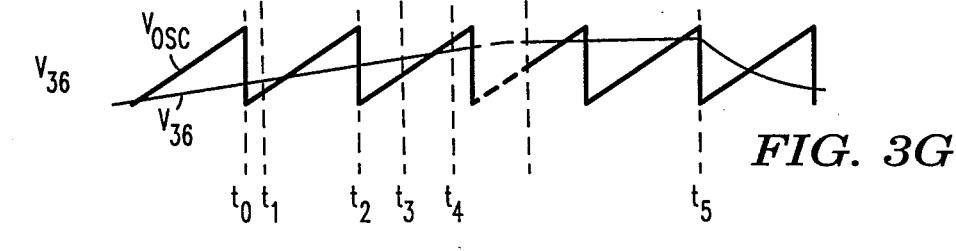

Again, initially assume that alternator 14 is operating under nominal load and voltage $V_{36}$ is at a particular value. At time $t_2$ of FIG. 3, a step increase in load 12 sharply reduces voltage $V_{BAT}$ which delays the trip point of comparator 26. The duty cycle of the input signal of driver 32 begins to increase; however, as shown in FIG. 3e and 3f at time $t_3$, as voltage $V_{OSC}$ applied at the second input of comparator 38 exceeds voltage $V_{36}$, comparator 38 goes high triggering the SET input of latch 40 causing the latter output signal to go low pulling the input signal of driver 32 low and shutting off the field current drive. The small increase in the duty cycle prior to tripping comparator 38 provides a limited charge to capacitor 36 and increases voltage $V_{36}$. If the load persists for subsequent oscillator cycles, voltage $V_{36}$ continues to increase as seen in FIG. 3g wherein at each step, the small increase in duty cycle also increases voltage $V_{36}$ and the point in the oscillator cycle at which comparator 38 trips until the duty cycle reaches its maximum value corresponding to full output power of alternator 14. Upon reaching steady state under increased load, the output power of alternator 14 has reached a balanced state with regulator 16 in that voltage $V_{BAT}$ remains depressed to provide the appropriate trip point for comparator 26 to maintain the required duty cycle and corresponding field current $I_f$ to support the load. During the load transient, battery 10 provides the required energy until engine 18 can increase torque to deliver the mechanical energy needed by alternator 14 to generate the required electrical power.

Now assume at time $t_5$ that the electric radiator fan, for example, is turned off causing a step increase in voltage $V_{BAT}$ thereby increasing voltages $V_{22}$ and $V_{SUM}$ accordingly. The increase in voltage $V_{SUM}$ provides a trip point for comparator 26 early in the oscillator cycle causing latch 30 to disable the input signal of driver 32. The decrease in the duty cycle of the output signal of latch 30 allows voltage $V_{36}$ to be discharged through a resistor in converter 34 to a level corresponding to the new steady state duty cycle required to support the system power. Subsequent load transients follow the same process wherein an increase in power demand on alternator 14 is met with a time delay (maximum typically 10 seconds) within regulator 16, namely, the secondary regulation loop, prohibiting instantaneous response while decreases in power demand are processed immediately, during one oscillator cycle (typically 5 milliseconds) whereby regulator 16 decreases the output power of alternator 14.

Figure 4:
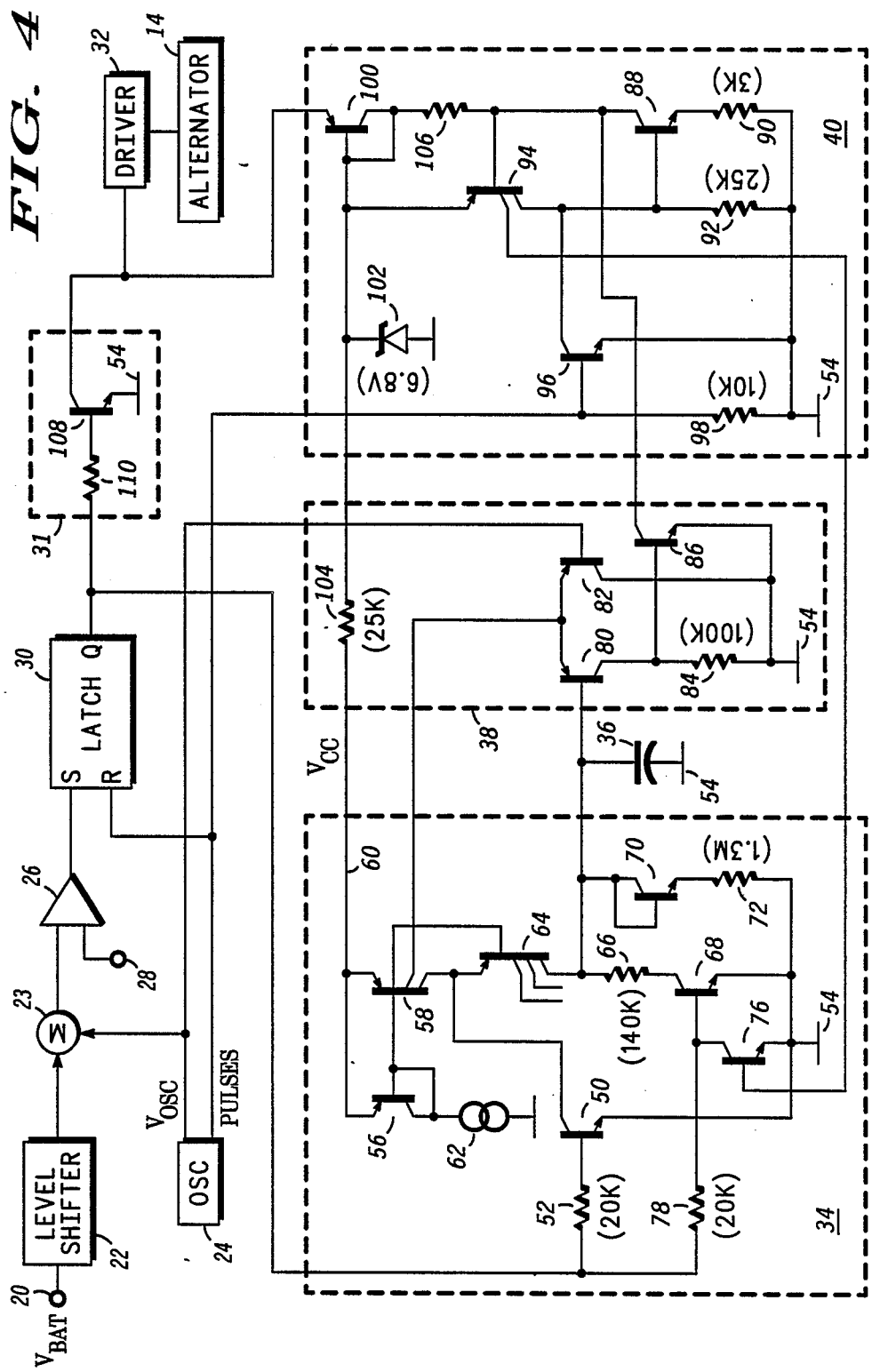
FIG. 4 a detailed schematic and block diagram illustrating the preferred embodiment of FIG. 2.

Referring to FIG. 4, the circuit schematics of duty cycle-voltage converter 34, comparator 38 and latch 40 as well the interconnection to the primary regulation loop are shown in detail. The connection of the primary regulation loop is the same as previously described; however, the output states of latch 30 and 40 are reversed in that the output signals are reset to a low state and set to a high state.

The output of latch 30 is coupled to the base of transistor 50 via resistor 52. The emitter of transistor 50 is coupled to power supply conductor 54 which typically operates at ground potential. The emitters of transistors 56 and 58 are coupled to power supply conductor 60 typically operating at a positive supply voltage. The collector and base of transistor 56 are coupled together to current supply 62. The bases of transistors 56 and 58 are coupled together forming a current mirror therebetween wherein the current flowing through current supply 62 is mirrored through transistor 56 and flows through the collector-emitter conduction path of transistor 58. This current is typically set at approximately 4 microamps in current supply 62. The first collector of transistor 58 is coupled to the emitter of transistor 64 and to the collector of transistor 50, while the base of transistor 64 is coupled to the bases of transistors 56 and 58. Transistor 64 is configured as a conventional current divider wherein the current flowing in the first collector is determined by the ratio of the common surface areas of the second and third collectors. The first collector of transistor 64 is coupled to the collector of transistor 68 through resistor 66 and to the base and collector of diode-configured transistor 70. The emitters of transistors 68 and 70 are coupled to power supply conductor 54 the latter path including resistor 72. The base and emitter of transistor 68 are coupled to the collector and emitter of transistor 76 respectively. The collector of transistor 76 is coupled to the output of latch 30 through resistor 78, and the emitter of transistor 76 is coupled to power supply conductor 54. The collector of transistor 70 is coupled to the output of duty cycle-voltage converter 34 which provides the charging current for capacitor 36 which is coupled between the output thereof and power supply conductor 54.

At the beginning of the oscillator cycle, the output signal of latch 30 is low corresponding to a reset condition. Transistor 50 is turned off allowing the current flowing through transistor 64 to charge capacitor 36. When comparator 26 trips, the output signal thereof goes high turning on transistor 50, sinking the current flowing in transistor 58 and pulling down the voltage at the emitter of transistor 64 thereby turning the latter off and shutting off the current flow to capacitor 36. Resistor 72 then slowly discharges capacitor 36. Thus, voltage $V_{36}$ is proportional to the duration of "on time" transistor 50 which is controlled by the duty cycle of the output signal of latch 30. Hence, the values of capacitor 36 and resistor 72 and the magnitude of current flowing in current supply 62 determines the time constant of the secondary regulation loop.

The collector of transistor 70 and the first output of oscillator 24 are coupled to the first and second inputs of comparator 38 provided at the bases of transistors 80 and 82 respectively. The emitters of transistor 80 and 82 are coupled together to the second collector of transistor 58 which provides a source of constant current. The collectors of transistors 80 and 82 are coupled to power supply conductor 54 wherein the former path including resistor 84. The collector of transistor 80 is coupled to the base of transistor 86, and the emitter of transistor 86 is coupled to power supply conductor 54.

The output of comparator 38 is provided at the collector of transistor 86 which is coupled to the SET input of latch 40 at the collector of transistor 88. The base of transistor 88 is coupled to the first collector of transistor 94 and to power supply conductor 54 the latter path including resistor 92. The emitter of transistor 88 is coupled through resistor 90 to power supply conductor 54. The base of transistor 88 is also coupled to the collector of transistor 96, and the second collector of transistor 94 is coupled to the base of transistor 76. The base of transistor 96 is responsive to the signal provided at the second output of oscillator 24 and its emitter is coupled to power supply conductor 54. The base of transistor 96 is also coupled to power supply conductor 54 through resistor 98. The base of transistor 94 is coupled through resistor 106 to the base and collector of diode configured transistor 100 which are also coupled to the anode of diode 102 and to the emitter of transistor 94. The cathode and anode of diode 102 are also coupled to power supply conductors 54 and 60, respectively, the latter path including resistor 104. The emitter of transistor 100 is coupled to the collector of transistor 108 at the input of driver 32 while the output of latch 30 is coupled to the base of transistor 108 via resistor 110. The emitter of transistor 108 is coupled to power supply conductor 54.

Referring to the operation of comparator 38 and latch 40, when the voltage at the base of transistor 82 exceeds voltage $V_{36}$, the conduction path through transistor 80 conducts more current than transistor 82 which develops a greater voltage across resistor 84 and turns on transistor 86. This pulls down the voltage at the base of transistor 94 turning it on which then supplies a bias to turn on transistor 88. The collector current flowing through transistor 88 maintains transistor 94 in conduction and latches the output at emitter of transistor 100. Latch 40 may be reset with a high pulse from the second output of oscillator 24 applied to the base of transistor 96 by pulling down the voltage at the base of transistor 88 to turn it off, thus breaking the positive feedback loop.

It should be readily apparent from the above description that comparator 38 should not trip before comparator 26 during quiescent operation; otherwise, the input signal of driver 32 would be prematurely terminated thereby inhibiting the control of the primary regulation loop. Capacitor 36, resistor 72 and current supply 62 are selected to generate an offset error in voltage $V_{36}$, typically a 20 percent higher voltage than would ordinarily be expected to trip comparator 38 at the point that the duty cycle exceeded its steady state value in response to a transient load. Transistors 68 and 76 provide a means to correct this offset error to a value typically 10 percent higher. The voltage at the second emitter of transistor 94 is applied at the base of transistor 76. When latch 40 is set, that is, transistors 88 and 94 are conductive, transistor 76 is turned on and transistor 68 is turned off and resistor 72 discharges capacitor 36. For a quiescent or decreasing load, latch 40 remains reset whereby transistor 76 is turned off which releases the base of transistor 68. When comparator 26 sets latch 30, transistor 68 conducts and sinks current through resistor 66. In this condition, resistor 66 and 72 are in parallel, effectively reducing the time constant of the discharge rate of capacitor 36 thereby reducing the offset error voltage thereacross.

Hence, what has been described is a novel regulation loop including a time constant which delays the response of the regulator to an increase in system loading, and yet immediately processes a decrease in the load to prevent overcharging of the system.

We claim:

1. A regulator responsive to an input signal proportional to the system supply voltage for controlling the output power of a alternator, comprising regulating means having an input responsive to the input signal and an output for providing a pulse train wherein the duty cycle of the pulse train is inversely proportional to the amplitude of the input signal; output driving means coupled between the output of the regulating means and the alternator for controlling the current flowing therein at a level proportional to the duty cycle of the pulse train; oscillating means for providing first and second output signals wherein the period of the first and second output signals is less than the time constant of the current flowing in the alternator, wherein the improvement comprises means coupled between the output of the regulating means and the output driving means for limiting the rate of increase in the duty cycle of the pulse train applied thereto upon detecting a decrease in the system supply voltage by disabling the pulse train at a point in the cycle of the oscillating means which increases each cycle until reaching the particular duty cycle required to support the load such that the duty cycle of the pulse train is reduced during one cycle of the oscillating means upon detecting an increase in the system supply voltage.

2. The regulator of claim 1 wherein said means for limiting the rate of increase in the duty cycle includes:
capacitive means for developing a voltage thereacross;
means for converting the duty cycle of the pulse train to a charging signal for developing said voltage across said capacitive means proportional to the duty cycle of the pulse train;
first comparing means for asserting an output signal when the first output signal of the oscillating means exceeds said voltage across said capacitive means; and
first latching means having first and second inputs and an output, said first latching means being responsive to said output signal of said first comparing means being applied to said first input for providing a low output signal, said first latching means also being responsive to the second output signal of the oscillating means applied to said second input for providing a high output signal, said output being coupled to the output of the driving means for disabling the pulse train in response to said output signal of said first comparing means.

3. The regulator of claim 2 wherein said means for converting includes:
current supply means having an output for providing a current of predetermined magnitude;
a first transistor having a base, an emitter and a collector, said base being responsive to said output signal of said first latching means, said emitter being coupled to a first power supply conductor;
a second transistor having a base, an emitter and a collector, said collector and base being coupled together to said output of said current supply means, said emitter being coupled to a second power supply conductor;
a third transistor having a base, an emitter and first and second collectors, said base being coupled to said base of said second transistor, said emitter being coupled to said second power supply conductor, said first collector being coupled to said collector of said first transistor;
a fourth transistor having a base, an emitter and first, second and third collectors, said emitter being coupled to said first collector of said third transistor, said base being coupled to said bases of said second and third transistors;
a fifth transistor having a base, an emitter and a collector, said base and collector being coupled together to said first collector of said fourth transistor and to output of said means for converting; and
a first resistor coupled between said emitter of said fifth transistor and said first power supply conductor.

4. The regulator of claim 3 wherein said means for converting further includes:
a sixth transistor having a base, an emitter and a collector, said collector being responsive to said output signal of said first latching means, said emitter being coupled to said first power supply conductor;
a seventh transistor having a base, an emitter and a collector, said base being coupled to said collector of said sixth transistor, said emitter being coupled to said first power supply conductor; and
a second resistor coupled between said first collector of said fourth transistor and said collector of said seventh transistor.

5. The regulator of claim 4 wherein said first comparing means includes:

an eighth transistor having a base, an emitter and a collector, said base being coupled to said first input of said first comparing means;

a third resistor coupled between said collector of said eighth transistor and said first power supply conductor;

a ninth transistor having a base, an emitter and a collector, said base being responsive to the first output signal of the oscillating means, said emitters of said ninth and tenth transistors being coupled to said second collector of said third transistor, said collector being coupled to said first power supply conductor; and a tenth transistor having a base, an emitter and a collector, said base being coupled to said collector of said eighth transistor, said emitter being coupled to said first power supply conductor, said collector being coupled to said output of said first comparing means.

6. The regulator of claim 5 wherein said first latching means includes:

an eleventh transistor having a base, an emitter and a collector coupled to said output of said first comparing means;

a fourth resistor coupled between said emitter of said eleventh transistor and said first power supply conductor;

a fifth resistor coupled between said base of said eleventh transistor and said first power supply conductor;

a twelfth transistor having a base, an emitter and first and second collectors, said base being coupled to said collector of said eleventh transistor, said first collector being coupled to said base of said eleventh transistor, said second collector being coupled to said base of said sixth transistor;

an sixth resistor coupled between said emitter of said twelfth transistor and said second power supply conductor;

a thirteenth transistor having a base, an emitter and a collector, said base and collector being coupled together to said emitter of said twelfth transistor, said emitter being coupled to the input of the output driving means;

a diode having an anode coupled to said emitter of said twelfth transistor and a cathode coupled to said first power supply conductor;

a fourteenth transistor having a base, an emitter and a collector, said collector being coupled to said base of said eleventh transistor, said emitter being to said first power supply conductor, said base being coupled to the second output of the oscillating means; and a seventh resistor coupled between said base of said fourteenth transistor and said first power supply conductor.

7. A regulator responsive to an input signal proportional to the system supply voltage for adjusting the current flowing in the field windings of an electrical alternator which controls the output power thereof, comprising:

output driving means coupled to the field windings of the alternator for controlling the current flowing therein;

oscillating means for providing first and second output signals;

regulating means having an input responsive to the input signal and an output coupled to said output driving means for providing a pulse train thereat which has duty cycle inversely proportional to the amplitude of the input signal;

capacitive means for developing a voltage thereacross;

means coupled to said output of said regulating means for converting said duty cycle of said pulse train to a charging signal for developing said voltage across said capacitive means proportional to said duty cycle of said pulse train;

first comparing means for asserting an output signal when said first output signal of said oscillating means exceeds said voltage across said capacitive means; and first latching means having first and second inputs and an output, said first latching means being responsive to said output signal of said first comparing means being applied to said first input for providing a low output signal, said first latching means also being responsive to said second output signal of said oscillating means applied to said second input for providing a high output signal, said output being coupled to said output of said driving means for disabling said pulse train in response to said output signal of said first comparing means.

8. The regulator of claim 7 wherein said means for converting includes:

current supply means having an output for providing a current of predetermined magnitude;

a first transistor having a base, an emitter and a collector, said base being responsive to said output signal of said first latching means, said emitter being coupled to a first power supply conductor;

a second transistor having a base, an emitter and a collector, said collector and base being coupled together to said output of said current supply means, said emitter being coupled to a second power supply conductor;

a third transistor having a base, an emitter and first and second collectors, said base being coupled to said base of said second transistor, said emitter being coupled to said second power supply conductor, said first collector being coupled to said collector of said first transistor;

a fourth transistor having a base, an emitter and first, second and third collectors, said emitter being coupled to said first collector of said third transistor, said base being coupled to said bases of said second and third transistors;

a fifth transistor having a base, an emitter and a collector, said base and collector being coupled together to said first collector of said fourth transistor and to output of said means for converting; and a first resistor coupled between said emitter of said fifth transistor and said first power supply conductor.

9. The regulator of claim 8 wherein said means for converting further includes:

a sixth transistor having a base, an emitter and a collector, said collector being responsive to said output signal of said first latching means, said emitter being coupled to said first power supply conductor;

a seventh transistor having a base, an emitter and a collector, said base being coupled to said collector of said sixth transistor, said emitter being coupled to said first power supply conductor; and a second resistor coupled between said first collector of said fourth transistor and said collector of said seventh transistor.

10. The regulator of claim 9 wherein said first comparing means includes:
    an eighth transistor having a base, an emitter and a collector, said base being coupled to said first input of said first comparing means;
    a third resistor coupled between said collector of said eighth transistor and said first power supply conductor;
    a ninth transistor having a base, an emitter and a collector, said base being responsive to said first output signal of said oscillating means, said emitters of said ninth and tenth transistors being coupled to said second collector of said third transistor, said collector being coupled to said first power supply conductor; and
    a tenth transistor having a base, an emitter and a collector, said base being coupled to said collector of said eighth transistor, said emitter being coupled to said first power supply conductor, said collector being coupled to said output of said first comparing means.

11. The regulator of claim 10 wherein said first latching means includes:
    an eleventh transistor having a base, an emitter and a collector coupled to said output of said first comparing means;
    a fourth resistor coupled between said emitter of said eleventh transistor and said first power supply conductor;
    a fifth resistor coupled between said base of said eleventh transistor and said first power supply conductor;
    a twelfth transistor having a base, an emitter and first and second collectors, said base being coupled to said collector of said eleventh transistor, said first collector being coupled to said base of said eleventh transistor, said second collector being coupled to said base of said sixth transistor;
    an sixth resistor coupled between said emitter of said twelfth transistor and said second power supply conductor;
    a thirteenth transistor having a base, an emitter and a collector, said base and collector being coupled together to said emitter of said twelfth transistor, said emitter being coupled to said input of said output driving means;
    a diode having an anode coupled to said emitter of said twelfth transistor and a cathode coupled to said first power supply conductor;
    a fourteenth transistor having a base, an emitter and a collector, said collector being coupled to said base of said eleventh transistor, said emitter being to said first power supply conductor, said base being coupled to said second output of said oscillating means; and
    a seventh resistor coupled between said base of said fourteenth transistor and said first power supply conductor.

12. The regulator of claim 11 wherein said regulating means includes:
    level shifting circuit responsive to the input signal for providing a reduced output signal;
    summing junction for combining said first signal of said oscillating means with said reduced input signal for providing an output signal proportional to variations in the input signal;
    second comparing means for providing an asserted output signal when said output signal of said summing junction exceeds a predetermined reference potential; and
    second latching means having first and second inputs and an output, said first input being responsive to said output of said first comparing means for providing a low output signal, said second input being responsive to said second output of said oscillating means for providing a high output signal, said output being coupled to said output driving means for generating said pulse train.

13. The regulator of claim 12 further comprising:
    a fifteenth transistor having a base, an emitter and a collector, said collector being coupled to said input of said output driving means, said emitter being to said second power supply conductor, said base being coupled to said output of said second latching means; and
    a tenth resistor coupled between said base of said fifteenth transistor and said output of said second latching means.

14. The regulator of claim 13 wherein said first output signal of said oscillating means has a sawtooth waveform wherein the slew rate of the rising edge is small in comparison to the slew rate of the falling edge.

15. The regulator of claim 14 wherein said second output signal of said oscillating means is high during the falling edge of said first output signal of said oscillating means and low otherwise.

16. A method of inserting a time delay in a regulator which is responsive to the system supply voltage for providing a pulse width modulation output signal for controlling the average field current flowing in a alternator, comprising the steps of:
    generating a pulse train having a duty cycle inversely proportional to the magnitude of the system supply voltage;
    developing first and second oscillating signals each having a period less than the time constant of the current flowing in the alternator;
    converting said duty cycle of said pulse train to a charging signal;
    using said charging signal to develop a voltage across a capacitor proportional to the duty cycle of pulse train;
    comparing said voltage across said capacitor to said first oscillating signal;
    disabling the pulse width modulated output signal when said first oscillating signal exceeds said voltage across said capacitor;
    using said second oscillating signal to reset said pulse width modulated output signal once each oscillating cycle; and
    increasing said voltage across said capacitor by a predetermined amount during each oscillator cycle as said duty cycle of said pulse train increases in response to an increase in the load applied to the alternator.

17. The method of claim 16 wherein said step of generating a pulse train having a duty cycle inversely proportional to the magnitude of the system supply voltage includes the steps of:
    reducing the system supply voltage to a level compatible with conventional electronic circuitry;

combining said reduced system supply voltage and said first oscillating signal for developing a summation signal;
comparing said summation signal to a predetermined reference signal;
disabling the pulse width modulated output signal when said summation signal exceeds said reference signal;
using said second oscillating signal to reset said pulse width modulated output signal once each oscillating cycle.

* * * * *

UNITED STATES PATENT AND TRADEMARK OFFICE
CERTIFICATE OF CORRECTION

PATENT NO.  : 4,931,717

DATED       : June 5, 1990

INVENTOR(S) : Randall C. Gray and Robert B. Jarrett

It is certified that error appears in the above-identified patent and that said Letters Patent is hereby corrected as shown below:

Column 3, line 61, delete "28" and insert therefor --26--.

Column 8, line 17, claim 2, delete "driving means" and insert therefor --regulating means--.

Column 10, line 23, claim 7, delete "driving" and insert therefor --regulating--.

Signed and Sealed this

Twenty-first Day of January, 1992

Attest:

HARRY F. MANBECK, JR.

*Attesting Officer*          *Commissioner of Patents and Trademarks*